Dec. 30, 1930.   B. L. MALLORY   1,786,956
SHOCK ABSORBER
Filed Aug. 1, 1928   3 Sheets-Sheet 1

Inventor
B. L. Mallory
By Hull Brock & West
Attorney

Dec. 30, 1930.   B. L. MALLORY   1,786,956
SHOCK ABSORBER
Filed Aug. 1, 1928   3 Sheets-Sheet 2

Inventor
B. L. Mallory
By Hull Brock & Weah
Attorney

Dec. 30, 1930.  B. L. MALLORY  1,786,956
SHOCK ABSORBER
Filed Aug. 1, 1928    3 Sheets-Sheet 3
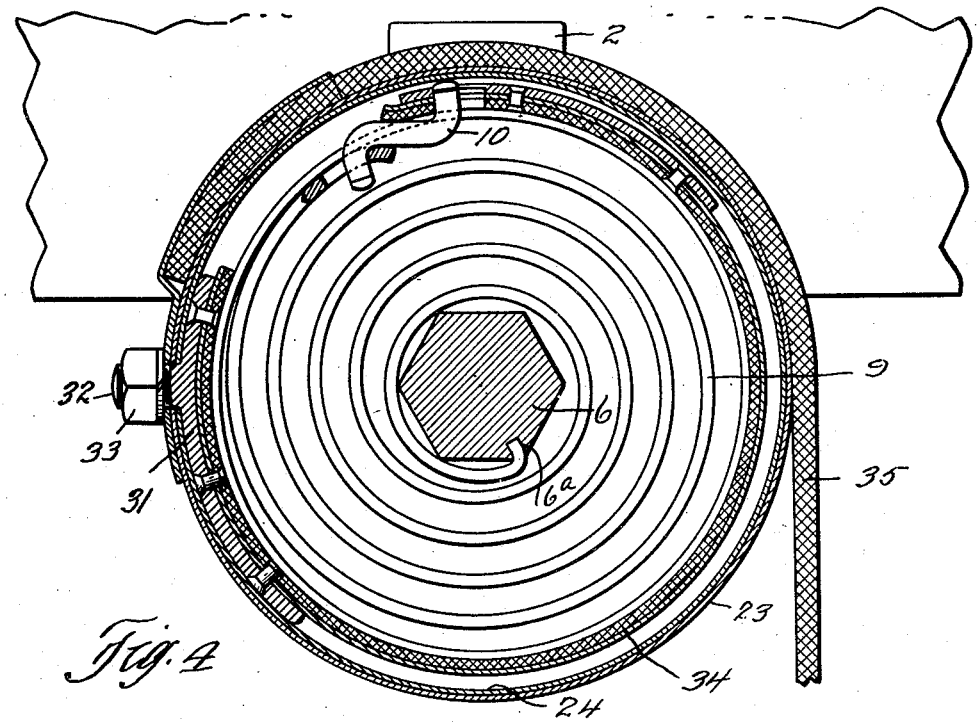
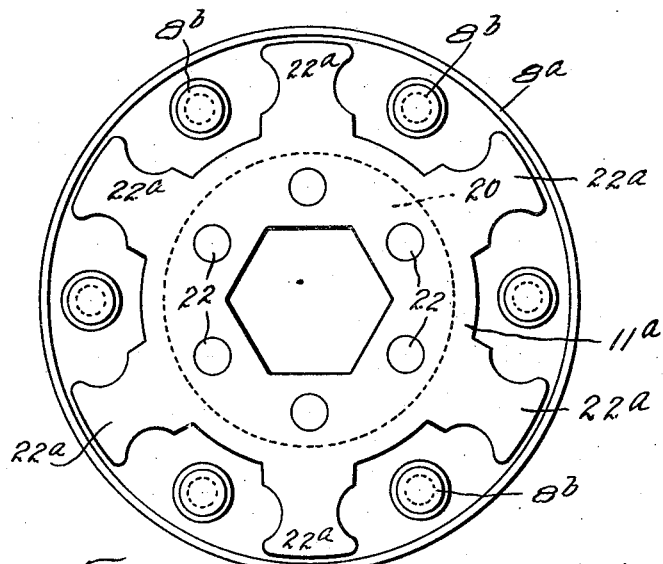
Inventor
B. L. Mallory
By Hull Brock & West
Attorney Patented Dec. 30, 1930

1,786,956

UNITED STATES PATENT OFFICE

BONNIE L. MALLORY, OF CLEVELAND HEIGHTS, OHIO, ASSIGNOR TO THE CLEVELAND SHOCK ABSORBER COMPANY, OF CLEVELAND, OHIO, A CORPORATION OF OHIO

SHOCK ABSORBER

Application filed August 1, 1928. Serial No. 296,642.

This invention relates generally to a shock absorber of the type used on motor vehicles for checking the rebound action of the vehicle springs.

The main object of the invention is to provide a shock absorbing device which shall include a coil spring so arranged as to normally maintain a tension on a belt which connects the device with the running gear of the vehicle so that when the running gear and vehicle frame move toward each other, the spring will serve to take up the shock in the belt and as the frame and running gear are moved apart or separated, such separation will be against the tension of the spring and also against the tension of a brake which will be automatically applied.

Another object of the invention is to provide a shock absorber which can be economically made largely of metal stampings and in which all of the working parts are enclosed within a weatherproof casing and which may be readily lubricated from the exterior.

A still further and important object of the invention is to provide a shock absorber of the character described which is provided with means for permitting a limited movement of the vehicle body and axles without any appreciable checking action and which is also provided with means for adjusting the spring to adjust the shock absorber for use on light or heavy vehicles.

Figure 1:
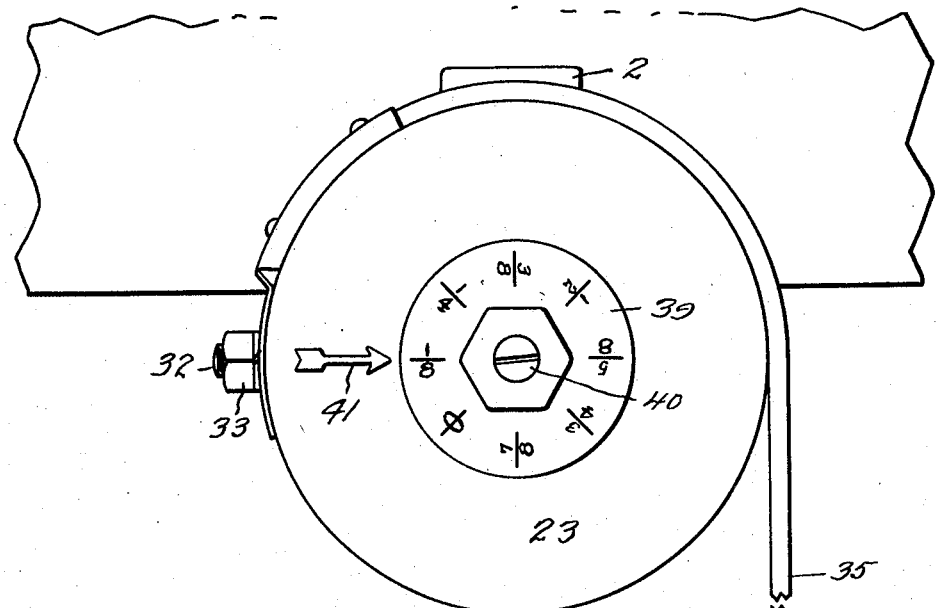
Figure 6:
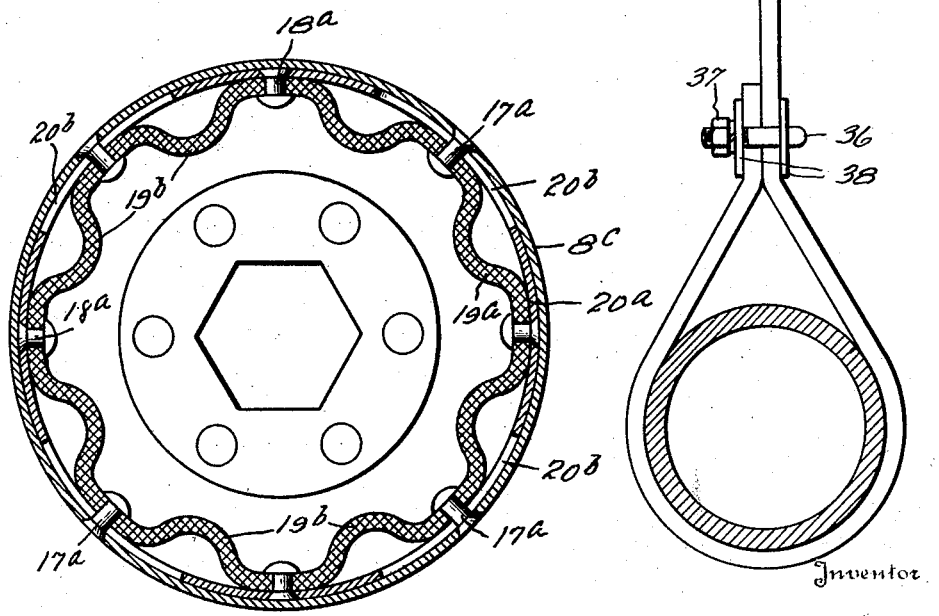
Figure 2:
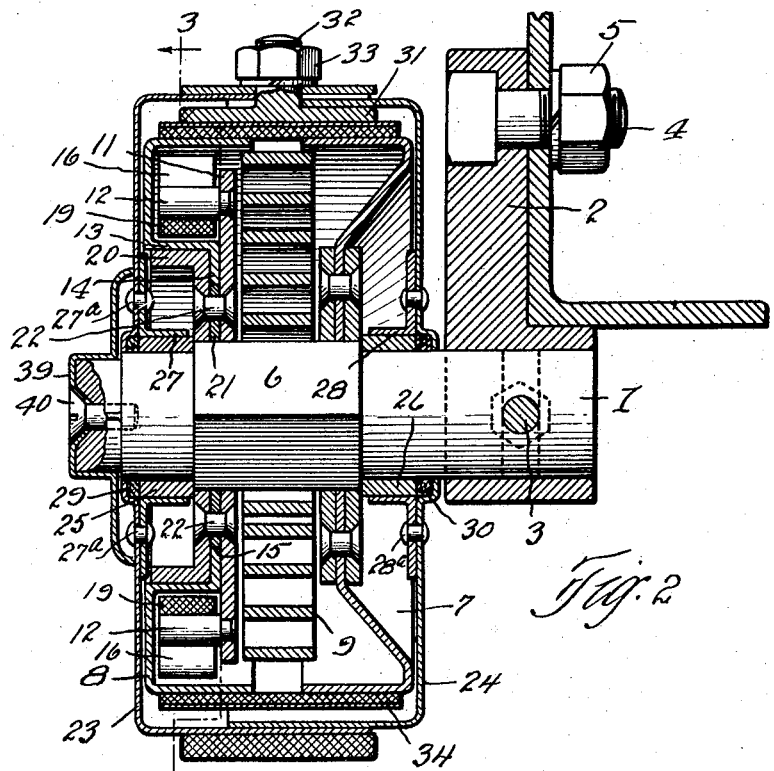
Figure 3:
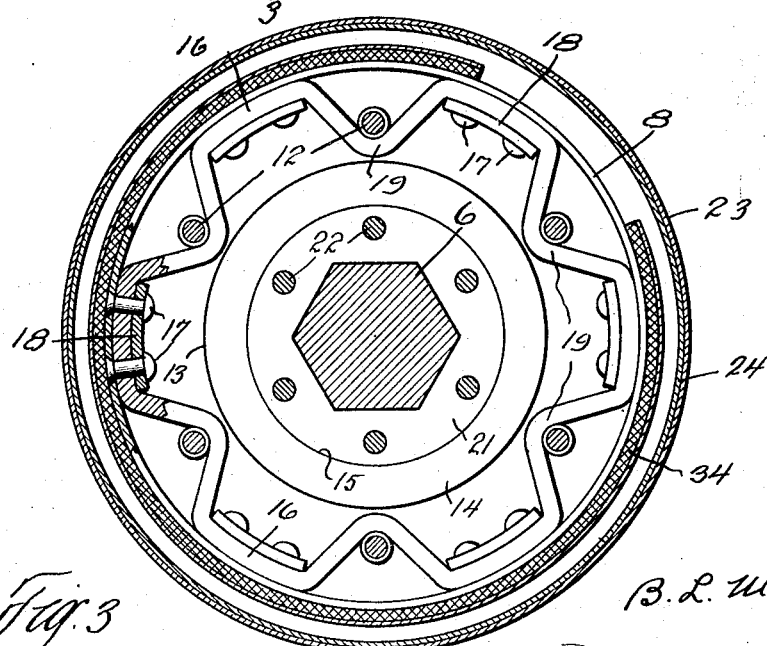

Further and more limited objects of the invention will appear as the description proceeds and by reference to the accompanying drawings, in which Fig. 1 is a view in side elevation of a shock absorber secured to vehicle body and connected with the vehicle axle by means of a flexible strap; Fig. 2 is a vertical sectional view through the shock absorber; Fig. 3 is a vertical sectional view on the line 3—3 of Fig. 2; Fig. 4 is a vertical sectional view similar to Fig. 2 but at right angles thereto and Figs. 5 and 6 illustrating two modified forms of the rotatable element.

Referring now to the drawings, the reference character 1 designates a shaft or stud, one end of which is apertured and extends through an opening in an angular block 2 and is non-rotatably secured therein by means of a pin or key 3. The block 2 is adapted to be secured to a portion of a vehicle body by means of a bolt 4 and nut 5.

The shaft 1 has a hexagonal central portion 6 and non-rotatably secured thereon is a brake drum composed of two annular sections 7 and 8. The brake drum section 7 is preferably formed from sheet metal and has a hexagonal shaped central bearing therein which fits the hexagonal portion 6 of the shaft and is shaped as shown most clearly in Fig. 2. The brake drum section 8 is shaped in section, as shown most clearly in Fig. 2 and has a centrally disposed annular opening therein somewhat larger than the hexagonal portion 6 of the shaft 1. Disposed between the drum sections 7 and 8 is a coil spring 9 which encircles the hexagonal portion 6 of the shaft and has one end inserted into a slot $6^a$ in the shaft and its opposite end disposed between the peripheral edges of the drum section. Secured to this end of the coil spring is an S-shaped hook 10 which projects between the drum sections, as shown in Fig. 4, also secured over the hexagonal portion of the shaft 6 and between the hub sections is an annular plate or disk 11 having a hexagonal opening therein whereby the same is non-rotatably secured to the shaft. The disk 11 has a plurality of pins or projections 12 thereon, which project outwardly therefrom into the hub section 8, as shown most clearly in Fig. 2. The hub section 8 has an inwardly extending annular extension 13 thereon terminating in a flange or shoulder 14 defining an annular opening 15 which is larger than the hexagonal portion of the shaft 6. Arranged within the hub section 8 and extending about the inner periphery thereof is a strip 16 of flexible material, preferably of raw hide, which is secured to the inner periphery of the hub section at spaced points by means of rivets 17 and plates 18 so as to provide looped portions 19 into which the pins 12 on plate 11 project, the purpose of which will hereinafter appear. Arranged within the annular extension 13 of the hub section 8 is a cup-shaped member 20 having apertures therein. Disposed between the disk 11 and the cup-shaped member 20 is an annular disk 21 which has a hexagonal opening therein adapted to fit over the hexagonal portion 6 of the shaft 1. This disk 21 is rigidly connected with the disk 11 and the cup-shaped member 21 by means of a plurality of pins or rivets 22. The hub sections are enclosed by a casing composed of a pair of sheet metal cup sections 23 and 24 which telescope one within the other, as shown most clearly in Fig. 2.

The sections 23 and 24 are fitted at their center with annular bushings 25 and 26 which are adapted to fit over the reduced ends of the shaft 1. The bushings 25 and 26 are held in place by annular flanges 27 and 28 which are secured to the outer walls of the housing by any suitable means, such as by rivets 27$^a$ and 28$^a$. Suitable packing rings 29 and 30 are also provided to prevent the lubricant from escaping past the ends of the shaft. Secured to the inner wall of the casing is a block or connecting member 31 which is shaped to fit the interior of the casing and is provided with a projection 32 which projects through suitable openings provided in the casing sections 23 and 24 and which is exteriorly threaded to receive a nut 33 by means of which the member is firmly and rigidly connected with the casing. Secured to the inner curved surface of the member 31 is a brake band 34 which substantially encircles the hub sections 7 and 8 and is connected at its opposite end to the hook 10. Secured to the projection 32 and extending about the outer periphery of the casing is a flexible web or belt 35, the lower end of which is adapted to be looped about a portion of a vehicle axle, as shown in Fig. 1 and is secured by a clamping member 36, nut 37 and suitable washers 38.

Secured over the outer end of the shaft 1 is a cap 39, the outer end of which is hexagonal in shape and which has suitable indicia thereon, as shown in Fig. 1. This cap is secured to the shaft by means of a screw 40 and serves as a means for adjusting the tension of the spring 9, whereby to adapt the device for use on different size vehicles. A suitable marker such as an arrow 41 is provided on the outer surface of the casing which, in conjunction with the indicia on the cap 39, serves as a means for giving a visual indication of the spring adjustment.

The operation of the device is as follows: With the parts in the position shown in Figs. 1, 2 and 3, upon a movement of the vehicle body A toward the axle B the coil spring 9, which is maintained under tension, will take up the slack in the flexible strap or belt 35. When the vehicle body A moves away from the axle B as a result of the rebound action of the vehicle springs, such movement will be against the tension of the coil spring 9. The disk 11 is rigidly connected with the hexagonal portion of the shaft and the projection 12 projects into the loops 19, as shown in Fig. 3. The cup-shaped member 20 is rotatably mounted in the hub section 8 and is rigidly connected with the disk 11 by the rivets 22. It will thus be seen that the two hub sections have a slight movement relative to each other which movement is limited and determined by size of the loops 19. This construction permits a slight movement of the vehicle body toward and away from the axle without any appreciable checking action. Such limited movement of the vehicle body as is obtained when the vehicle is being driven over paved streets or boulevards is not restrained and the riding comfort of the vehicle is greatly improved. In order to tension the spring to adapt the device for use on different size vehicles, the pin 3 is removed and a suitable wrench applied to the hexagonal cap to turn the shaft to place a greater tension on the coil spring 9. The shaft 1 has a plurality of openings therein so arranged that the spring may be secured in the adjusted position. The indicia on the cap and the arrow on the casing serve as a means for determining this adjustment.

In Fig. 5 there is shown a modified form of the means for permitting a limited movement of the hub sections with respect to each other. In this construction the hub section 8 is replaced by the hub section 8$^a$ having a plurality of projections 8$^b$ thereon. The disk or plate 11 is replaced by a member 11$^a$ having a hexagonal opening therein. The member 11$^a$ is rigidly connected to the cup-shaped member 20 by means of rivets 22 and has a plurality of projections 22$^a$ thereon which are disposed between the projections or pin 8$^b$ with the result that the hub sections will have a limited movement with respect to each other, which movement is determined by the space between the projections 22$^a$.

In Fig. 6 there is disclosed a second modification of the means for permitting a relative movement of the hub sections. In this construction the hub section 8 is replaced by the hub section 8$^c$. Fitting within the hub section 8$^c$ is a cup-shaped member 20$^a$ having slots 20$^b$ therein. The raw hide strip 19$^a$ is secured to the hub section 8$^c$ at spaced points by rivets 17$^a$ which project through the slots 20$^b$. The raw hide strip is also secured to the cup-shaped member at spaced points by rivets 18$^a$. The projections 12 on the disk 11 project into the looped portions 19$^b$. Therefore, it will be seen that the movement between the cup-shaped member 20$^a$ and hub section 8$^c$ is limited and determined by the length of the slots 20$^b$.

In other respects the modifications shown in Figs. 5 and 6 are identical with the construction shown in Figs. 1 to 4 inclusive. Various other changes may be made in the arrangement of parts and details of construction without departing from the spirit of my invention and it is to be understood that my invention is to be limited only in accordance with the scope of the appended claims.

It will now be clear that I have provided a shock absorber which will accomplish the objects of the invention as hereinbefore stated.

Having thus described my invention, what I claim is:

1. A shock absorbing device comprising a shaft adapted to be connected with a vehicle chassis, a coil spring disposed about said shaft and having one end fastened thereto, a brake drum enclosing said spring and made up of a pair of sections one of which is nonrotatably mounted on said shaft, a brake band disposed about said drum and connected with the opposite end of said spring, a casing enclosing said brake drum, a connection between said brake band and casing and a belt connected to said casing and to a vehicle running gear, one of said brake drum sections having a limited movement with respect to the other sections.

2. A shock absorbing device comprising a shaft adapted to be connected to a vehicle chassis, a coil spring encircling said shaft and having one end secured thereto, a brake drum mounted on said shaft and consisting of a pair of sections, one of which is non-rotatably mounted on said shaft, one of which has a limited movement with respect to the shaft, a brake band disposed about said brake drum and connected with the opposite end of said coil springs, and a belt connected with said brake band and the vehicle running gear.

3. A shock absorbing device comprising a shaft adapted to be mounted on a vehicle chassis, a coil spring encircling said shaft and having one end connected therewith, a brake drum secured over said shaft and consisting of a pair of sections, one of which is non-rotatably connected with said shaft and the other of which has a limited movement with respect to said shaft, a brake band disposed about said drum and having one end connected with said spring, a casing surrounding said brake drum and means connecting said brake band with said casing.

4. A shock absorbing device comprising a shaft adapted to be non-rotatably connected with a vehicle chassis, a coil spring encircling said shaft and having one end connected therewith, a pair of brake drum sections mounted on said shaft and enclosing said spring, the opposite end of said spring being disposed between said brake drum sections, a brake band disposed about said drum sections and connected with the end of said spring, a casing enclosing said brake drum sections, a belt extending about said casing having one end operatively connected with said brake band and its opposite end adjusted for connection with the vehicle running gear.

5. A shock absorbing device comprising a shaft adapted to be non-rotatably connected to a vehicle chassis, a coil spring having its inner end connected to said shaft, a pair of brake drum sections fitted on said shaft and normally enclosing said spring one of said sections being nonrotatably mounted on said shaft, and one of said brake drum sections having limited movement with respect to said shaft, a brake band disposed about said drum sections and having an end portion connected with the outer end of said spring, a casing enclosing said brake drum sections, means connecting the opposite end of said brake band to said casing, a belt disposed about said casing and having one end adapted for connection with a vehicle running gear and its opposite end connected with said casing.

6. A shock absorbing device comprising a shaft adapted to be non-rotatably connected with a vehicle chassis, a coil spring having its inner end connected with said shaft, a pair of brake drum sections fitted on said shaft and normally enclosing said spring one of said sections being nonrotatably mounted on said shaft, and one of said brake drum sections having a limited movement with respect to said shaft, the opposite end of said coil spring being disposed between said brake drum sections, a brake band extending about said drum sections and connected with the end of said spring, a casing enclosing said brake drum sections, the opposite end of said brake band being connected with said casing and a belt connected to and disposed about said casing and adapted for connection with the vehicle running gear.

7. A shock absorbing device comprising a shaft adapted for connection to a vehicle chassis, a coil spring encircling said shaft and having its inner end connected therewith, a pair of brake drum sections fitting over said shaft and normally enclosing said spring one of said sections being non-rotatably mounted on said shaft, the opposite end of said spring being disposed between said drum sections, a casing enclosing said brake drum sections and a brake band having one end connected with the end of said spring and its opposite end connected with said casing and means for connecting said casing with the vehicle running gear.

8. A shock absorbing unit comprising a shaft adapted for connection to a vehicle chassis, a pair of brake drum sections mounted on said shaft, a coil spring arranged within said brake drum sections and having one end connected with said shaft and its opposite end disposed between said brake drum sections, one of said brake drum sections having a limited movement with respect to said shaft and the other brake drum section, and a casing enclosing said brake drum sections.

9. In a shock absorbing unit the combination of a shaft adapted to be non-rotatably connected with a vehicle chassis, a pair of brake drum sections mounted on said shaft, one of said brake drum sections having a limited movement with respect to the shaft and the other section, a coil spring arranged within said brake drum sections and having one end connected with said shaft and its opposite end disposed between said brake drum sections.

10. A device for retarding motion between two relatively movable members comprising a casing supported for rotation upon an axis fixed with respect to one of said members, connections between the casing and the other of said members of such a nature that upon relative movement between said members the case will be caused to rotate a mechanism arranged within said casing for rotating the same in one direction and for retarding this rotation in the opposite direction, said mechanism including a pair of brake drum sections secured about said axis one of said sections being non-rotatably mounted on said shaft, and one of said brake drum sections having a limited movement with respect to the other section.

11. A device for retarding movement between two relatively movable members comprising a casing supported for rotation upon a shaft fixed with respect to one of said members, a flexible element connected with said casing at one end and extending about the casing and having its opposite end connected with the other of said movable members whereby upon relative movement between said members the casing will be caused to rotate, a mechanism arranged within said casing for rotating the casing in one direction, and for retarding its rotation in the opposite direction, said mechanism including a coil spring having one end connected with one of said movable members and its opposite end connected with a brake band arranged within said casing and a pair of brake drum sections carried by said shaft, one of said sections being non-rotatably secured to said shaft and the other of said sections having a limited movement with respect to said shaft.

12. A device for retarding motion between two relatively movable members comprising a shaft carried by one of said members and whereon said casing is rotatable, a pair of brake drum sections mounted on said shaft and having a limited movement with respect to each other and one section being non-rotatably mounted on said shaft, a spring connected at one end to said shaft and its opposite end to a part of said casing and tending to rotate said casing in one direction and a brake band having one end secured to said casing and extending about said brake drum sections and having its opposite end connected with said spring.

13. A shock absorber comprising a shaft adapted to be connected with a vehicle chassis, a spring extending about said shaft and having one of its ends connected therewith, a casing rotatably mounted on said shaft, a pair of brake drum sections fitted on said shaft, one of said brake drum sections being non-rotatably secured to said shaft and the other of said brake drum sections having a limited rotary movement with respect to said shaft, a brake band extending about said drum sections and having one end connected with the opposite end of said coil spring and its other end connected with said casing.

14. A shock absorber comprising a shaft adapted for connection with a vehicle chassis, a coil spring encircling said shaft and having its inner end connected therewith, a pair of brake drum sections fitted on said shaft and enclosing said spring one of said sections being non-rotatably mounted on said shaft, there being a circumferentially extending opening between said brake drum sections and the opposite end of said coil spring being disposed adjacent said opening, one of said brake drum sections having a limited movement with respect to the other section, a casing enclosing said brake drum sections, a brake band extending about said brake drum sections and having one end connected with said spring and its opposite end connected with said casing.

15. A shock absorber for retarding movement between two relatively movable members comprising a waterproof lubricant-tight casing, a shaft carried by one of said members and whereon said casing is rotatably mounted, a spring arranged within said casing and having one of its ends connected with said shaft, a brake drum surrounding said spring, a brake band connected with said casing and partially encircling said brake drum and connected with the opposite end of said spring and a connection between the casing and the other of said members of such a nature that upon relative movement between said members the casing will be rotated, said brake drum consisting of a pair of sections, one of which is non-rotatably connected with said shaft and the other of which has a limited movement with respect to said shaft.

16. A device for retarding motion between two relatively movable members comprising a shaft adapted for connection with one of said movable members, a brake drum surrounding said shaft and having two sections, one of which is non-rotatably mounted on said shaft, a coil spring arranged within said brake drum and having its inner end secured to said shaft, a brake band extending about said drum and having one of its ends connected with the opposite end of said spring through a circumferentially extending slot in the periphery of said drum and its opposite end connected with said casing and a belt having one end connected with said casing and extending about said casing and having its free end adapted for connection with the other of said movable members, said brake drum consisting of a pair of sections, one of which has a limited movement with respect to the other section.

17. A device for retarding movement between two relatively movable members and comprising a shaft adapted for attachment to one of said movable members, a casing rotatably mounted on said shaft, a coil spring surrounding said shaft and having one end connected therewith, a brake drum mounted on said shaft and surrounding said spring, a brake band having one end connected with said casing and extending about said brake drum and having its opposite end connected with the opposite end of said spring and a connection between said casing and the other of said movable members of such a nature that upon relative movement between said members said casing will be rotated, said brake drum consisting of a plurality of sections, one of which is non-rotatably connected with said shaft and the other of which has a limited movement with respect thereto.

18. A device for retarding movement between two relatively movable members comprising a casing supported for rotation upon a shaft fixed with respect to one of said movable members, a flexible connection between said casing and the other of said movable members of such a nature that upon relative movement between said members the casing will be caused to rotate, mechanism for rotating said casing including a coil spring having one end fixed to said shaft, a brake drum mounted on said shaft and surrounding said spring, a brake band extending about said brake drum and having one end connected with said casing and its opposite end connected with the opposite end of said spring, said brake drum consisting of a plurality of sections, one of which is non-rotatably connected with said shaft and the other of which has a limited movement with respect to said shaft.

19. In a shock absorber the combination of a shaft adapted for connection with a vehicle chassis, a casing rotatably mounted on said shaft, a coil spring encircling said shaft and having one end connected therewith, a brake drum mounted on said shaft and consisting of a pair of sections, one of which is non-rotatably connected with said shaft and resilient connection between the shaft and the other brake drum section, a brake band extending about said brake drum and having one end connected with said casing and its opposite end connected with the other end of said coil spring.

20. A shock absorber comprising a shaft adapted for connection with a vehicle axle and having a non-circular portion, a casing rotatably mounted on said shaft, a coil spring encircling said shaft and having one end connected therewith, a brake drum mounted on the non-circular portion of said shaft, a brake band extending about said brake drum and having one end connected with said casing and its opposite end connected with the other end of said coil spring through a circumferentially extending opening in said brake drum, a belt extending about said casing and having one end connected with said casing and its opposite end adapted for connection with a vehicle axle, the said brake drum consisting of a pair of sections, one of which is non-rotatably connected with the non-circular portion of said shaft and means connecting the other section with the non-circular portion of said shaft in such a manner as to permit a limited rotary movement of the same with respect to the shaft and means for adjusting the relative position of said shaft to vary the tension of said coil spring.

In testimony whereof, I hereunto affix my signature.

BONNIE L. MALLORY.